(12) United States Patent
Yoshida

(10) Patent No.: US 6,670,919 B2
(45) Date of Patent: Dec. 30, 2003

(54) ADAPTIVE ANTENNA RECEIVING APPARATUS

(75) Inventor: Shousei Yoshida, Tokyo (JP)

(73) Assignee: NEC Corporation, Tokyo (JP)

(*) Notice: Subject to any disclaimer, the term of this patent is extended or adjusted under 35 U.S.C. 154(b) by 19 days.

(21) Appl. No.: 10/061,217

(22) Filed: Feb. 4, 2002

(65) Prior Publication Data

US 2002/0135514 A1 Sep. 26, 2002

(30) Foreign Application Priority Data

Feb. 8, 2001 (JP) ........................................ 2001-032870

(51) Int. Cl.[7] ................................................. G01S 3/16
(52) U.S. Cl. ...................................... 342/378; 342/375
(58) Field of Search ................................ 342/368, 378, 342/375, 382, 383

(56) References Cited

U.S. PATENT DOCUMENTS

| | | | | |
|---|---|---|---|---|
| 5,563,610 A | * | 10/1996 | Reudink ..................... | 342/375 |
| 5,621,752 A | * | 4/1997 | Antonio et al. ............. | 375/200 |
| 6,385,181 B1 | * | 5/2002 | Tsutsui et al. .............. | 370/335 |
| 2002/0054621 A1 | * | 5/2002 | Kyeong et al. ............. | 375/147 |
| 2002/0072393 A1 | * | 6/2002 | McGowan et al. ......... | 455/562 |

FOREIGN PATENT DOCUMENTS

| | | |
|---|---|---|
| JP | 01-206746 A | 8/1989 |
| JP | 11-055216 B2 | 2/1999 |
| JP | 11-274976 A | 10/1999 |
| JP | 11-298345 A | 10/1999 |
| JP | 2000-022612 A | 1/2000 |

* cited by examiner

*Primary Examiner*—Dao Phan
(74) *Attorney, Agent, or Firm*—Sughrue Mion, PLLC

(57) ABSTRACT

In an adaptive antenna receiving apparatus, a plurality of correlations between adjacent antennas are detected for each path, a fixed beam unique to each path arrival direction of the desired wave is formed on the basis of a vector generated by averaging the detected correlations, and each path is received and combined, or a plurality of correlations between adjacent antennas are detected for each signal sequence despread with a plurality of chip timings, a fixed beam unique to the arrival direction of each signal sequence is formed on the basis of a vector generated by averaging the detected correlations, and a path timing is detected on the basis of a delay profile generated from an output of each signal sequence, or a plurality of correlations between adjacent antennas are detected for each signal sequence despread with a plurality of chip timings, a fixed beam unique to the arrival direction of each signal sequence is formed on the basis of a vector generated by averaging the detected correlations, a path timing is detected on the basis of a delay profile generated from an output of each signal sequence, and each path is received and combined using the path timing and the fixed beam at the path timing.

12 Claims, 7 Drawing Sheets

SIGNAL ARRIVAL DIRECTION (DEGREE)

ADAPTIVE ANTENNA RECEIVING APPARATUS

BACKGROUND OF THE INVENTION

1. Field of the Invention

The present invention relates to an adaptive antenna receiving apparatus and, more particularly, to an adaptive antenna receiving apparatus which receives a CDMA (Code Division Multiple Access) signal and adaptively forms an antenna directional beam to receive a desired wave and also removes interference.

2. Description of the Prior Art

CDMA is expected as a radio access scheme for a mobile communication cellular system of next generation because of its capability of increasing the subscriber capacity. However, on the base station receiving side, simultaneously accessing user signals interfere with each other. To remove interference between user signals, an adaptive array antenna has been proposed.

An adaptive array antenna receives signals using a plurality of antennas, and weights and combines the received signals using complex numbers. Next, the adaptive array antenna forms a directional beam by controlling the amplitude and phase of the reception signal of each antenna. With this operation, only a desired user signal can be received. Additionally, any other user interference signal can be suppressed.

Two methods of determining the antenna weight of an adaptive antenna have been generally known.

As one method, a weight is determined by feedback control using an adaptive update algorithm such as LMS (Least Mean Square) or RLS in accordance with the MMSE (Minimum Mean Square Error) (feedback control method).

The other is an open loop control method in which the direction of arrival of a desired wave is estimated from an antenna reception signal by using an arrival direction estimating algorithm such as MUSIC or ESPRIT, and a beam is directed to that direction.

This open loop control method has an advantage that the antenna weight can be accurately calculated even from a short reception signal sequence, unlike the feedback control method. However, the arithmetic amount becomes large.

Japanese Unexamined Patent Publication No. 11-274976 has proposed "Array Antenna System at Radio Base Station" which uses a method of easily determining an antenna weight without using any complex arrival direction estimating algorithm in the open loop control method.

FIG. 1 shows an adaptive antenna receiving apparatus according to this prior art. This adaptive antenna receiving apparatus has L (L is a positive integer) path signal processing means 101-1 to 101-L. As the number L, a number corresponding to a multipath transmission path in a mobile communication environment, i.e., the number of paths is employed such that the path signal processing means receive and demodulate CDMA signals.

The path signal processing means 101-1 to 101-L have antenna weight calculation means 102-1 to 102-L, beam formers 103-1 to 103-L, and RAKE combining/weighting means 104-1 to 104-L, respectively. The path #1 signal processing means 101-1 will be described below. The description also applies to the path #2 signal processing means 101-2 to path #L signal processing means 101-L.

The antenna weight calculation means 102-1 has an antenna signal in-phase averaging means 106-1, correlation-to-reference-antenna detection means 107-1, and time averaging means 108-1.

The antenna signal in-phase averaging means 106-1 improves the SINR by matching the phases of despread symbols of the respective paths and adding their vectors.

This operation cannot be performed when the symbols are modulated. However, in-phase addition can be done after modulation is canceled by a known pilot symbol using a pilot signal. The larger the number of symbols for in-phase averaging becomes, the more the SINR can be improved. However, it is limited if a quick phase variation is present due to fading or the like.

The antenna signal in-phase averaging means 106-1 can employ an arbitrary number of symbols to be averaged and an arbitrary method of weighting each symbol.

The correlation-to-reference-antenna detection means 107-1 detects the correlation between a reference antenna reception signal and the remaining antenna reception signals. More specifically, the correlation-to-reference-antenna detection means 107-1 multiplies the reception signal of another antenna by the complex conjugate signal of the reference antenna reception signal.

For example, antenna No. 1 is defined as a reference antenna. The output from the correlation-to-reference-antenna detection means 107-1 is given by $$R(i,j,m) = Z_{EL}(i,j,m) Z^*_{EL}(i,1,m) \quad (1)$$

where i (i is an integer; $1 \leq i \leq L$) is the path number, j (j is an integer; $2 \leq j \leq N$) is the antenna number, and m (m is a positive integer) is the output number of an output $Z_{EL}(i,j,m)$ from the antenna signal in-phase averaging means 106-1.

FIG. 6 shows signals received by array antennas 61-1 to 61-N (N is a positive integer). The signal received by each antenna has a phase lag depending on its direction of arrival. For example, the signal received by the antenna element 61-1 (reference antenna element) has a phase lag of $(j-1)(2\pi d/\lambda)\sin\phi_0$ with respect to the signal received by the jth antenna element 61-j (j is an integer; $1<j \leq N$). In this case, $\phi_0$ is the direction of signal arrival, d is the interval between adjacent antennas, and $\lambda$ is the signal wavelength.

Hence, the phase of R(i, j, m) is ideally detected as $(j-1)(2\pi d/\lambda)\sin\phi_0$.

The time averaging means 108-1 averages a plurality of outputs from the correlation-to-reference-antenna detection means 107-1. An arbitrary time and method can be employed as an averaging time and weighting method to be used for this averaging. An output from the time averaging means 108-1 is an antenna weight w(i,j,m).

The beam former 103-1 weights and combines the respective antenna reception signal using the antenna weights w(i,j,m) output from the time averaging means 108-1. That is, using the antenna weights calculated by the antenna weight calculation means 102-1, despread signals are received by antenna directional beams for the respective paths.

FIG. 4 shows the arrangement of the beam former 103-1 of path #1. The number of antennas is N (N is a positive integer).

The beam formers 103-1 to 103-L have complex conjugate means (41-1-1 to N) to (41-L-1 to N), multipliers (42-1-1 to N) to (42-L-1 to N), and combiners 43-1 to 43-L, respectively.

Each of the complex conjugate means 41-1-1 to 41-1-N calculates a complex conjugate $w^*(i, j, m)$ of the antenna weight w(i,j,m) (j in the antenna weight w and its complex conjugate $w^*$ is an integer; $j \geq 1$).

Each of the multipliers 42-1-1 to 42-1-N multiplies a corresponding despread input in path #1 by the complex conjugate w*(i, j, m) of the antenna weight.

The combiner 43-1 adds the outputs from the multipliers 42-1-1 to 42-1-N, thereby calculating the beam former output.

The phase of the complex conjugate w*(i,j,m) of the antenna weight is ideally $-(j-1)(2\pi d/\lambda)\sin \phi_0$. Hence, the beam former 103-1 acts to combine signals that have arrived from the direction $\phi_0$ such that the reception signals of the respective antennas and the reception signal of the reference antenna element 61-1 are in phase. In addition, since a signal that has arrived from a direction different from the direction $\phi_0$ is not in phase, a beam that has a gain in the direction $\phi_0$ and reduces gains in directions other than $\phi_0$ can be formed.

The RAKE combining/weighting means 104-1 compensates for a variation in phase of the output from the beam former 103-1, i.e., phase of the reference antenna and weights the output to combine the paths (RAKE combining). That is, the RAKE combining/weighting means 104-1 weights the beam output of each path. This weighting is executed such that the SINR (Signal to Interference and Noise Ratio) after combining is maximized.

The combiner 105 adds the weighted outputs of the respective paths to obtain a demodulated output. That is, the combiner 105 adds the outputs from the path signal processing means 101-1 to 101-L, thereby obtaining a high-quality demodulated output.

In the above-described conventional adaptive antenna receiving apparatus, however, the phases of the reception signals of the respective antennas can be made to match the phase of the reference antenna only when the averaging time of the antenna signal in-phase averaging means 106-1 to 106-L or time averaging means 108-1 to 108-L is sufficiently long. That is, only in this case, the beam center can be directed to the signal arrival direction $\phi_0$.

That is, if the averaging time is short, the phase accuracy of the antenna weight degrades due to interference or noise. For this reason, the beam center direction shifts. In addition, the interference suppression characteristic outside the beam band also largely degrades.

SUMMARY OF THE INVENTION

The present invention has been made in consideration of the above problems of prior art, and has as its object to provide an adaptive antenna receiving apparatus which obtains an additional averaging effect by detecting the correlations between adjacent antennas for all antennas and adding them, and also obtains an excellent interference suppression characteristic outside a beam band with little shift in beam center direction by using a fixed beam weight as an antenna weight even when the averaging time of antenna weight calculation is short.

In order to achieve the above object, according to the first aspect of the present invention, there is provided an adaptive antenna receiving apparatus which receives a CDMA (Code Division Multiple Access) signal by an array antenna, adaptively forms a directional beam to receive a desired wave, and suppresses interference, wherein a plurality of correlations between adjacent antennas are detected for each path, a fixed beam unique to each path arrival direction of the desired wave is formed on the basis of a vector generated by averaging the plurality of detected correlations, and each path is received and combined.

In order to achieve the above object, according to the second aspect of the present invention, there is provided an adaptive antenna receiving apparatus which receives a CDMA (Code Division Multiple Access) signal by an array antenna, adaptively forms a directional beam to receive a desired wave, and suppresses interference, wherein a plurality of correlations between adjacent antennas are detected for each signal sequence despread with a plurality of chip timings, a fixed beam unique to an arrival direction of each signal sequence is formed on the basis of a vector generated by averaging the plurality of detected correlations, and a path timing is detected on the basis of a delay profile generated from an output of each signal sequence.

In order to achieve the above object, according to the third aspect of the present invention, there is provided an adaptive antenna receiving apparatus which receives a CDMA (Code Division Multiple Access) signal by an array antenna, adaptively forms a directional beam to receive a desired wave, and suppresses interference, wherein a plurality of correlations between adjacent antennas are detected for each signal sequence despread with a plurality of chip timings, a fixed beam unique to an arrival direction of each signal sequence is formed on the basis of a vector generated by averaging the plurality of detected correlations, a path timing is detected on the basis of a delay profile generated from an output of each signal sequence, and each path is received and combined using the path timing and the fixed beam at the path timing.

In order to achieve the above object, according to the fourth aspect of the present invention, there is provided an adaptive antenna receiving apparatus wherein an antenna weight of the fixed beam in any one of the above first to third aspects is generated to give 0 phase shift to a reception signal at a geometrical center of the array antenna.

In order to achieve the above object, according to the fifth aspect of the present invention, there is provided an adaptive antenna receiving apparatus which receives a CDMA (Code Division Multiple Access) signal by an array antenna, adaptively forms a directional beam to receive a desired wave, and suppresses interference, comprising antenna signal in-phase averaging means, arranged for each path, for in-phase-averaging a despread signal of each antenna, adjacent antenna correlation detection means for detecting correlation between adjacent antennas for each output of the antenna signal in-phase averaging means, antenna correlation averaging means for averaging outputs from the adjacent antenna correlation detection means, time averaging means for time-averaging outputs from the antenna correlation averaging means, normalization means for normalizing an output from the time averaging means, fixed beam weight generation means for fixing an output from the normalization means, a beam former for executing beam forming for the despread signal using an output from the fixed beam weight generation means, RAKE combining/weighting means for weighting using an output from the beam former and the output from the fixed beam weight generation means, and a combiner for combining outputs from the RAKE combining/weighting means of respective paths and outputting a demodulated signal.

In order to achieve the above object, according to the sixth aspect of the present invention, there is provided an adaptive antenna receiving apparatus which receives a CDMA (Code Division Multiple Access) signal by an array antenna, adaptively forms a directional beam to receive a desired wave, and suppresses interference, comprising a sliding correlator for outputting a signal sequence obtained by dispreading a reception signal with a plurality of chip timings, antenna signal in-phase averaging means, arranged for each signal sequence, for in-phase-averaging a signal of each antenna, adjacent antenna correlation detection means for detecting correlation between adjacent antennas for each output of the antenna signal in-phase averaging means, antenna correlation averaging means for averaging outputs from the adjacent antenna correlation detection means, time averaging means for time-averaging outputs from the antenna correlation averaging means, normalization means for normalizing an output from the time averaging means, fixed beam weight generation means for fixing an output from the normalization means, a beam former for executing beam forming for the despread signal sequence using an output from the fixed beam weight generation means, delay profile generation means for generating a delay profile from an output from the beam former, and path timing detection means for detecting a path timing from the delay profile.

In order to achieve the above object, according to the seventh aspect of the present invention, there is provided an adaptive antenna receiving apparatus which receives a CDMA (Code Division Multiple Access) signal by an array antenna, adaptively forms a directional beam to receive a desired wave, and suppresses interference, comprising a sliding correlator for outputting a signal sequence obtained by dispreading a reception signal with a plurality of chip timings, antenna signal in-phase averaging means, arranged for each signal sequence, for in-phase-averaging a signal of each antenna, adjacent antenna correlation detection means for detecting correlation between adjacent antennas for each output of the antenna signal in-phase averaging means, antenna correlation averaging means for averaging outputs from the adjacent antenna correlation detection means, time averaging means for time-averaging outputs from the antenna correlation averaging means, normalization means for normalizing an output from the time averaging means, fixed beam weight generation means for fixing an output from the normalization means, a first beam former for executing beam forming for the despread signal sequence using an output from the fixed beam weight generation means, delay profile generation means for generating a delay profile from an output from the first beam former, path timing detection means for detecting a path timing from the delay profile, a second beam former arranged for each path to receive each path using the path timing and a fixed beam at the path timing, RAKE combining/weighting means for weighting an output from the second beam former, and a combiner for combining outputs from the RAKE combining/weighting means of respective paths and outputting a demodulated signal.

In order to achieve the above object, according to the eighth aspect of the present invention, there is provided an adaptive antenna receiving apparatus wherein the fixed beam weight generation means of any one of the above fifth to seventh aspects generates an antenna weight of a fixed beam to give a 0 phase shift to a reception signal at a geometrical center of the array antenna.

As is apparent from the above aspects, according to the present invention, an additional averaging effect is obtained by detecting a plurality of correlations between adjacent antennas and adding them. In addition, as an antenna weight, a fixed beam weight that sets the geometrical center of the antenna at 0 phase shift is used. Hence, an excellent interference suppression characteristic outside the beam band with little shift in beam center direction can be realized even when the averaging time of antenna weight calculation is short.

In the present invention, antenna weights are calculated in a short time by open loop control simultaneously with calculation of each path timing, and each path timing is detected using a beam-formed signal, thereby realizing an excellent path timing detection characteristic.

Additionally, in the present invention, when the demodulation/reception section executes beam forming using the antenna weight of a corresponding path timing in antenna weights used by the path timing detection section, the demodulation/reception section need not newly calculate antenna weights.

The above and many other objects, features and advantages of the present invention will become manifest to those skilled in the art upon making reference to the following detailed description and accompanying drawings in which preferred embodiments incorporating the principle of the invention are shown by way of illustrative examples.

DETAILED DESCRIPTION OF THE PREFERRED EMBODIMENTS

Some preferred embodiments of the present invention will be described below in detail with reference to the accompanying drawings.

First Embodiment

Figure 1:
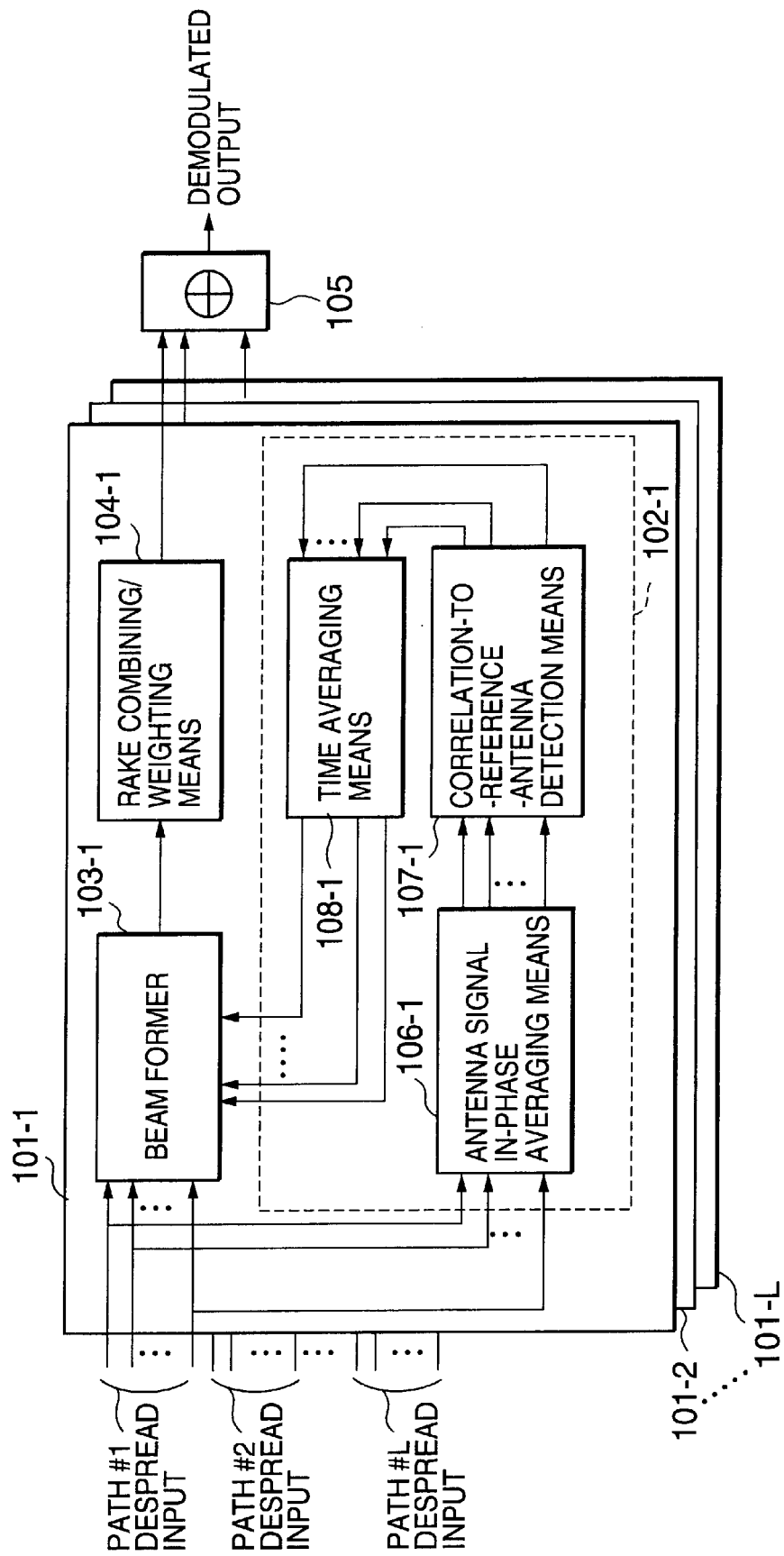
FIG. 1 is a block diagram showing a conventional adaptive antenna receiving apparatus.
Figure 2:
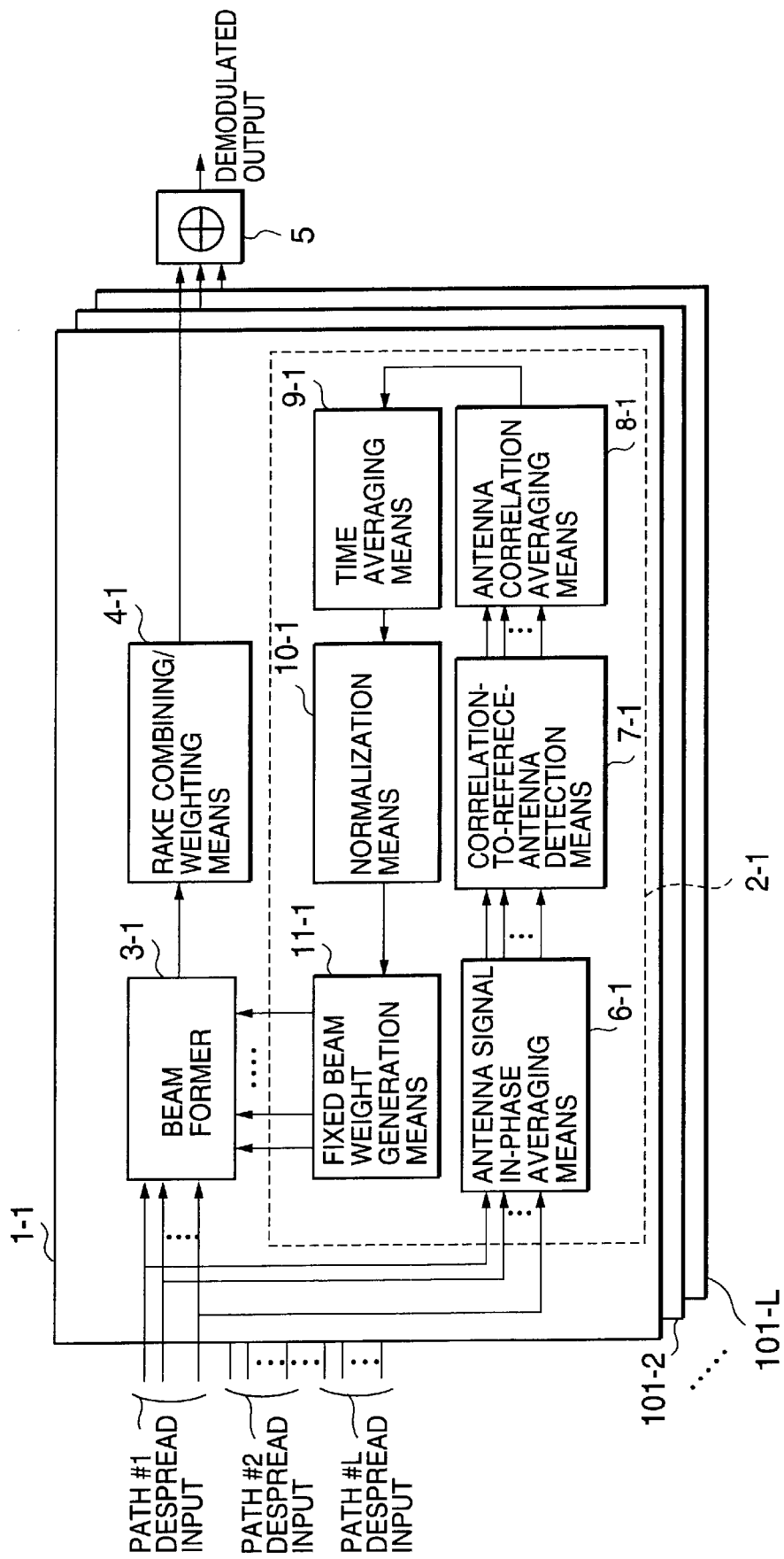
FIG. 2 is a block diagram showing the first embodiment of the present invention.

The first embodiment of the present invention will be described with reference to FIG. 2. The first adaptive antenna receiving apparatus according to the present invention has path signal processing means 1-1 to 1-L corresponding to a multipath transmission path in a mobile communication environment to receive and demodulate CDMA signals. That is, when L (L is a positive integer) multipath transmission paths are present, L path signal processing means are arranged.

This adaptive antenna receiving apparatus has the path signal processing means 1-1 to 1-L and combiner 5.

The path signal processing means 1-1 to 1-L have antenna weight calculation means 2-1 to 2-L, beam formers 3-1 to 3-L, and RAKE combining/weighting means 4-1 to 4-L, respectively. The path signal processing means 1-1 corresponding to path #1 will be described below. The description also applies to the path signal processing means 1-2 to 1-L.

The antenna weight calculation means 2-1 has an antenna signal in-phase averaging means 6-1, adjacent antenna correlation detection means 7-1, antenna correlation averaging means 8-1, time averaging means 9-1, normalization means 10-1, and fixed beam weight generation means 11-1.

The antenna signal in-phase averaging means 6-1 improves the SINR by matching the phases of despread symbols of the respective paths and adding their vectors. This operation cannot be performed when the symbols are modulated. However, in-phase addition can be done after modulation is canceled by a known pilot symbol using a pilot signal. The larger the number of symbols for in-phase averaging becomes, the more the SINR can be improved. However, it is limited if a quick phase variation is present due to fading or the like.

The antenna signal in-phase averaging means 6-1 can employ an arbitrary number of symbols to be averaged and an arbitrary method of weighting each symbol.

The adjacent antenna correlation detection means 7-1 detects the correlation between the reception signals of adjacent antennas. More specifically, the adjacent antenna correlation detection means 7-1 multiplies the reception signal of the jth antenna by the complex conjugate signal of the antenna reception signal of the (j−1)th antenna. The output from the adjacent antenna correlation detection means 7-1 is given by $$R(i,j,m) = Z_{EL}(i,j,m) Z^*_{EL}(i,j-1,m) \quad (2)$$

where i (i is an integer; $1 \leq i \leq L$) is the path number, j (j is an integer; $2 \leq j \leq N$) is the antenna number, and m (m is a positive integer) is the output number of an output $Z_{EL}(i,j,m)$ from the antenna signal in-phase averaging means 6-1.

Figure 6:
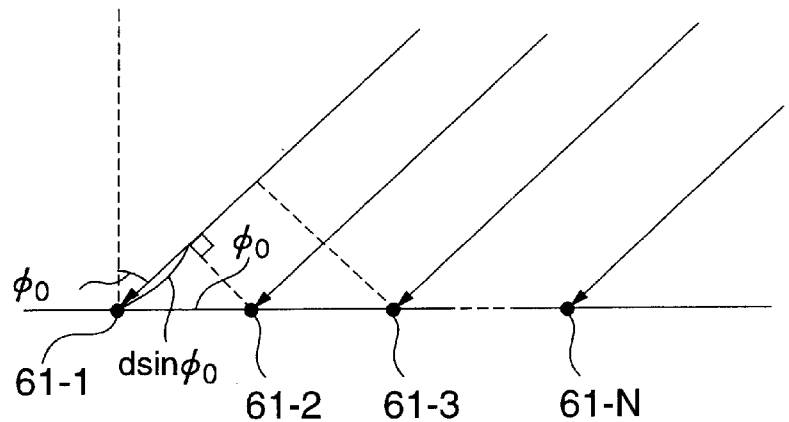
FIG. 6 is a graph showing signals received by an array antenna.

As shown in FIG. 6, the phase of R(i,j,m) is ideally detected as $(2\pi/\lambda)\sin \phi_0$.

The antenna correlation averaging means 8-1 averages outputs from the adjacent antenna correlation detection means 7-1 by $$R(i, m) = \frac{1}{N-1} \sum_{i=2}^{N} R(i, j, m) \quad (3)$$

That is, the adaptive antenna receiving apparatus according to the present invention obtains the correlation R(i,j,m) between the reception signals of adjacent antennas using the adjacent antenna correlation detection means 7-1 and averages the outputs R(i,j,m) from the adjacent antenna correlation detection means 7-1 using the antenna correlation averaging means 8-1. In other words, additional averaging operation is performed for all antennas. The employment of this arrangement is the first factor that gives rise to the effect of the present invention (to be described later).

The time averaging means 9-1 averages a plurality of outputs from the antenna correlation averaging means 8-1. In other words, averaging processing is executed for the plurality of outputs from the antenna correlation averaging means 8-1.

For example, outputs $R_{AV}(i,m)$ from the time averaging means 9-1 to 9-L by weighted mean using a forgetting coefficient $\lambda_{AV}$ are given by $$R_{AV}(i,m) = (1-\lambda_{AV})R(i,m) + \lambda_{AV} R_{AV}(i,m-1) \quad (4)$$

The time averaging means 9-1 can employ an arbitrary time and method as an averaging time and weighting method.

The normalization means 10-1 normalizes the output vector $R_{AV}(i,m)$ from the time averaging means 9-1. A normalized vector $R_{AVN}(i,m)$ is given by $$R_{AVN}(i, m) = \frac{R_{AVN}(i, m)}{|R_{AVN}(i, m)|} \quad (5)$$

When the number N of antennas is even, in addition to the normalized vector $R_{AVN}(i,m)$, a normalized vector $R_{AVN2}(i,m)$ that has a phase ½ that of $R_{AVN}(i,m)$ is generated by $$R_{AVN2}(i, m) = \frac{R_{AVN}(i, m) + 1.0}{|R_{AVN}(i, m) + 1.0|} \quad (6)$$

The fixed beam weight generation means 11-1 generates a fixed beam weight such that the phase of a reception signal has 0 shift at the geometrical center of the array antenna. That is, the beam weight is fixed. Fixed beam weights w(i,j,m) can be calculated in the following way depending on whether the number N of antennas is even or odd.

When the number N of antennas is even, fixed beam weights w(i,j,m) is given by $$w(i, j, m) = \frac{1}{N} R_{AVN2}(i, m) \left[ j = \frac{N}{2} + 1 \right] \quad (7)$$

$$w(i, j, m) = w(i, j-1, m) R_{AVN}(i, m) \left[ \frac{N}{2} + 1 \leq j \leq N \right]$$

$$w(i, j, m) = \frac{1}{N} R^*_{AVN2}(i, m) \left[ j = \frac{N}{2} \right]$$

$$w(i, j, m) = w(i, j, m) R^*_{AVN}(i, m) \left[ 1 \leq j \leq \frac{N}{2} - 1 \right]$$

When the number N of antennas is odd, the fixed beam weights w(i,j,m) is given by $$w(i, j, m) = \frac{1}{N} \left[ j = \frac{N+1}{2} \right] \quad (8)$$

$$w(i, j, m) = w(i, j-1, m) R_{AVN}(i, m) \left[ \frac{N+1}{2} + 1 \leq j \leq N \right]$$

$$w(i, j, m) = w(i, j+1, m) R^*_{AVN}(i, m) \left[ 1 \leq j \leq \frac{N+1}{2} - 1 \right]$$

The geometrical center of the antenna is thus set at 0 phase shift in antenna weight generation to prevent any phase shift of a beam-formed output signal when the center of a fixed beam shifts with respect to the actual signal arrival direction $\phi_0$ due to an error in antenna weight calculation.

Such a phase shift poses a very serious problem when phase averaging is executed for a plurality of antenna weight update periods in transmission path at a beam former output.

When the geometrical center of the antenna is set at 0 phase shift, the beam former output can always have a predetermined shift even when the beam center shifts.

When phase averaging is not executed for a plurality of antenna weight update periods at a beam former output, the position of 0 phase shift of the antenna can be arbitrarily set.

Generation of a fixed beam weight based on a normalized vector having adjacent antenna phase difference information is the second factor that gives rise to the effect of the present invention.

The normalization means 10-1 and fixed beam weight generation means 11-1 may be implemented in the following way.

The normalization means 10-1 first calculates a phase $\theta(i,m)$ of the output vector $R_{AV}(i,m)$ of the time averaging means 9-1 by arctangent operation. That is, the phase $\theta(i,m)$ is calculated by $$\theta(i, m) = \tan^{-1} \frac{\text{Im}[R_{AV}(i, m)]}{\text{Re}[R_{AV}(i, m)]} \quad (9)$$

Next, the normalized vector $R_{AVN}(i,m)$ is calculated by $$R_{AVN}(i,m) = \cos[\theta(i,m)] + j\sin[\theta(i,m)] \quad (10)$$

In addition to the normalized vector $R_{AVN}(i,m)$, the normalization means 10-1 also generates a normalized vector $R_{AVN3}(i,m)$ that has a phase $-(N-1)/2$ times that of $R_{AVN}(i,m)$ by $$R_{AVN3}(i, m) = \cos\left[\frac{N-1}{2}\theta(i, m)\right] - j\sin\left[\frac{N-1}{2}\theta(i, m)\right] \quad (11)$$

The fixed beam weight generation means 11-1 generates a fixed beam weight such that the phase of a reception signal has 0 shift at the geometrical center of the array antenna. The fixed beam weights $w(i,j,m)$ can be given by $$w(i, j, m) = \frac{1}{N}R_{AVN3}(i, m)(j = 1) \quad (12)$$

$$w(i, j, m) = w(i, j-1, m)R_{AVN}(i, m)(2 \leq j \leq N)$$

(j in the fixed beam weight w is a positive integer; $1 \leq j \leq N$)

The fixed beam weight generation means 11-1 may generate the normalized vector $R_{AVN2}(i,m)$ that has a phase ½ that of $R_{AVN}(i,m)$ in place of the normalized vector $R_{AVN3}(i,m)$. In this case, the normalized vector $R_{AVN2}(i,m)$ is given by $$R_{AVN2}(i, m) = \cos\left[\frac{1}{2}\theta(i, m)\right] - j\sin\left[\frac{1}{2}\theta(i, m)\right] \quad (13)$$

The beam former 3-1 weights and combines the antenna reception signals using the antenna weights output from the fixed beam weight generation means 11-1. That is, using the antenna weights calculated by the antenna weight calculation means 2-1, despread signals are received by antenna directional beams for the respective paths.

Figure 4:
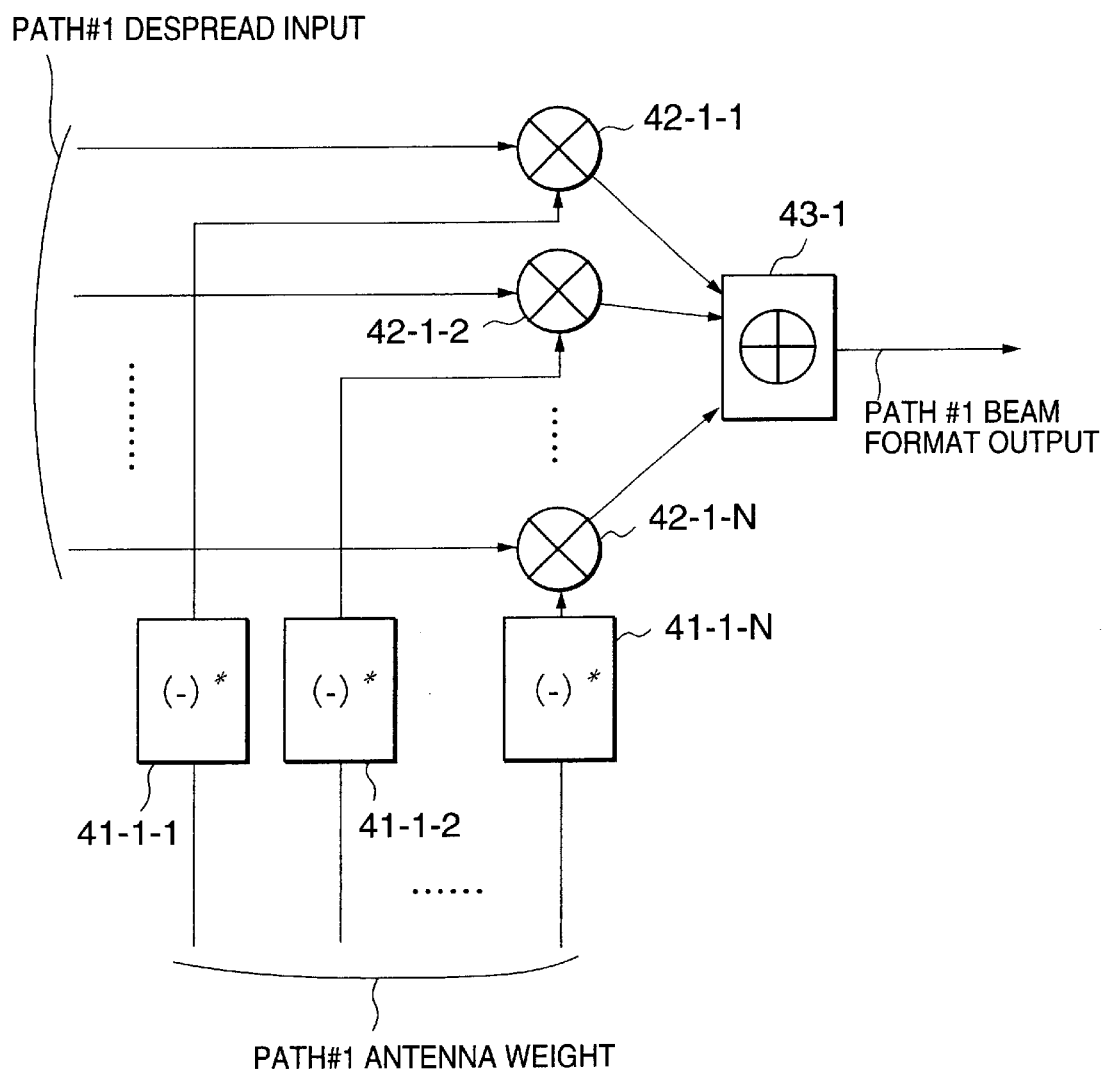
FIG. 4 is a block diagram showing a beam former.

FIG. 4 shows the arrangement of the beam former 3-1 of path #1. The number of antennas is N (N is a positive integer).

The beam formers 3-1 to 3-L have complex conjugate means (41-1-1 to N) to (41-L-1 to N), multipliers (42-1-1 to N) to (42-L-1 to N), and combiners 43-1 to 43-L, respectively. The beam former 3-1 will be exemplified here.

Each of the complex conjugate means 41-1-1 to 41-1-N calculates the complex conjugate of the antenna weight.

Each of the multipliers 42-1-1 to 42-1-N multiplies a corresponding despread input in path #1 by the complex conjugate of the antenna weight.

The combiner 43-1 adds the outputs from the multipliers 42-1-1 to 42-1-N, thereby calculating the beam former output.

The beam former 3-1 acts to combine signals that have arrived from the direction $\phi_0$ such that the reception signals of the respective antennas and the reception signal at the geometrical center of the antenna are in phase. In addition, since a signal that have arrived from a direction different from the direction $\phi_0$ is not in phase, a beam that has a gain in the direction $\phi_0$ and reduces gains in directions other than $\phi_0$ can be formed. Since the beam former 3-1 forms a fixed beam, its beam gain characteristic is represented by $$g(\phi) = 10\log_{10}\left|\frac{\sin\left[\frac{N\pi}{2}(\sin\phi - \sin\phi_0)\right]}{N\sin\left[\frac{\pi}{2}(\sin\phi - \sin\phi_0)\right]}\right| \quad (14)$$

Figure 7:
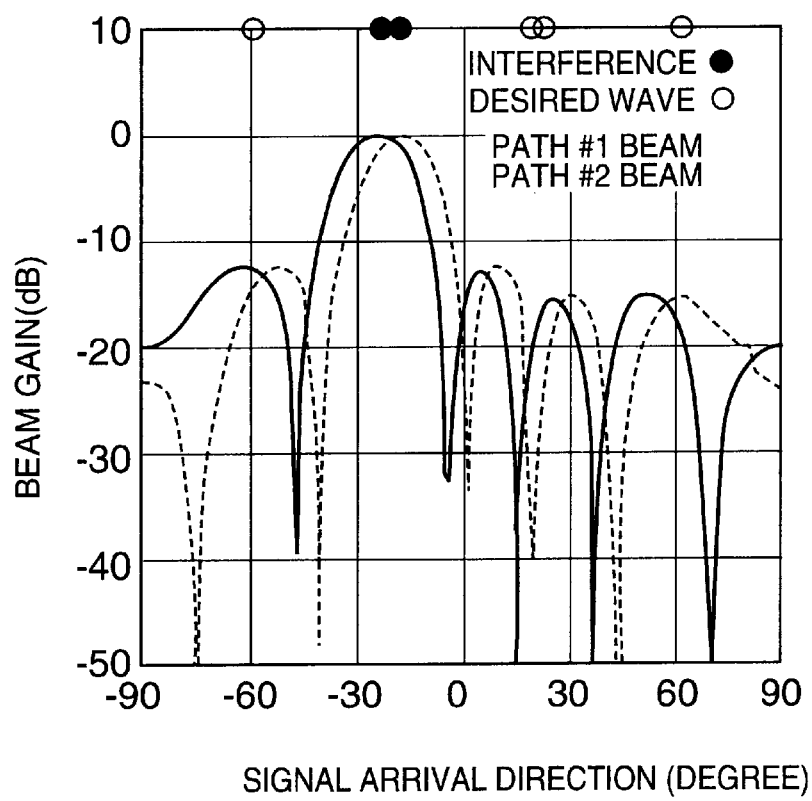
FIG. 7 is a graph showing beam patterns according to the present invention.

FIG. 7 shows the gain characteristic of a beam formed by the adaptive antenna receiving apparatus of the present invention assuming that the beam center is accurately directed to the signal arrival direction $\phi_0$. The number of paths is 2.

The RAKE combining/weighting means 104-1 compensates for a variation in phase of the output from the beam former 103-1 and weights the output to combine the paths (RAKE combining).

Figure 5:
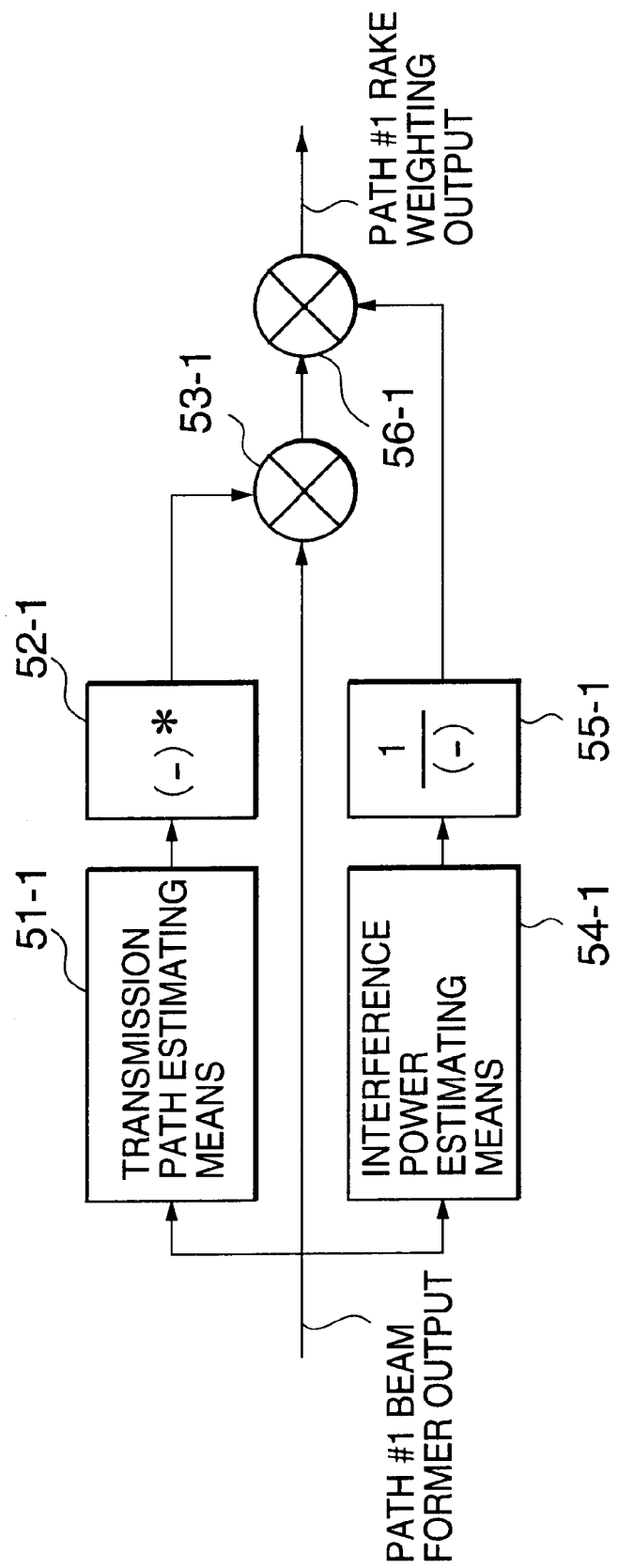
FIG. 5 is a block diagram showing a RAKE combining/weighting means.

FIG. 5 shows the arrangement of the RAKE combining/weighting means 4-1 for path #1. The RAKE combining/weighting means 4-1 has a transmission path estimating means 51-1, complex conjugate means 52-1, multiplier 53-1, interference power estimating means 54-1, reciprocal calculation means 55-1, and multiplier 56-1 and executes weighting of [desired wave amplitude]/[interference power] to realize maximum ratio combining. That is, weighting is performed such that the SINR after combining is maximized for the beam output of each path.

To save the arithmetic amount, only the desired wave amplitude may be weighted. In this case, the RAKE combining/weighting means 4-1 to 4-L can employ an arbitrary weighting method.

The combiner 5 adds the weighted outputs of the respective paths to obtain a demodulated output. That is, the combiner 5 adds the outputs from the path signal processing means 1-1 to 1-L, thereby obtaining a high-quality demodulated output.

As described above, the adaptive antenna receiving apparatus of the present invention obtains an additional averaging effect by detecting the plurality of correlations between adjacent antennas and adding them. The adaptive antenna receiving apparatus generates a fixed beam weight as an antenna weight. Hence, the adaptive antenna receiving apparatus has an excellent interference suppression characteristic outside the beam band with little shift in beam center direction even when the averaging time of antenna weight calculation is short.

Figure 8:
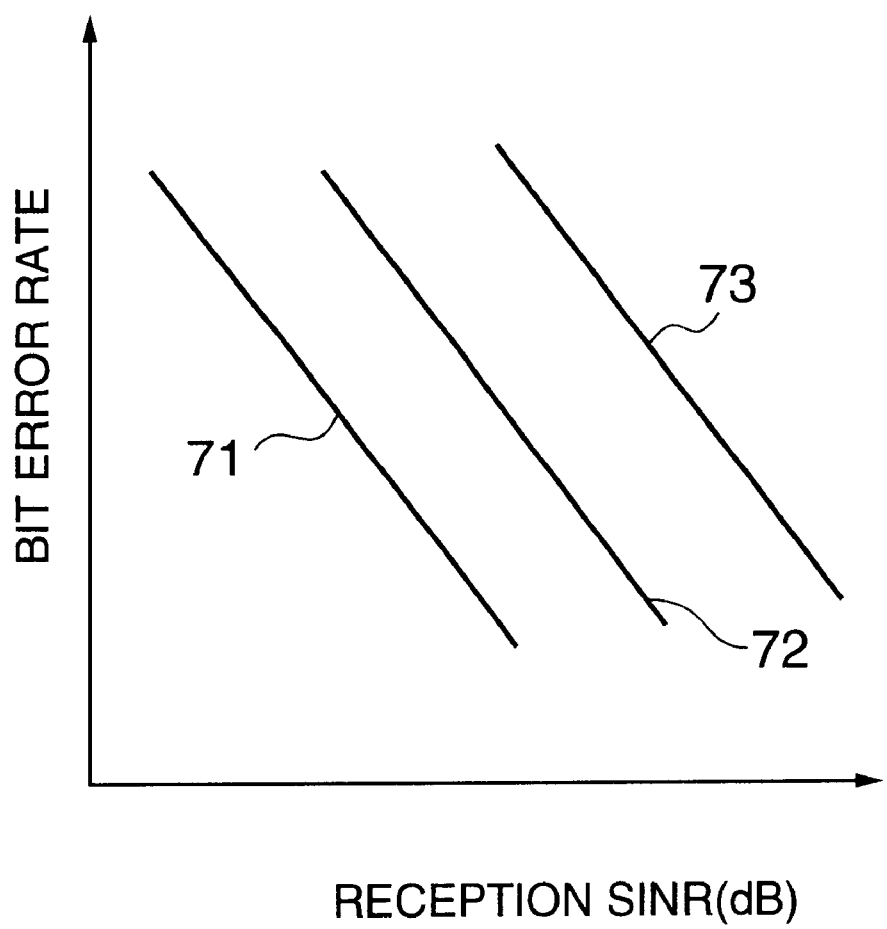
FIG. 8 is a graph showing the characteristics of the adaptive antenna receiving apparatus of the present invention and the conventional adaptive antenna receiving apparatus.

FIG. 8 is a graph showing the characteristics of this adaptive antenna receiving apparatus and the conventional adaptive antenna receiving apparatus. The abscissa represents the SINR (Signal to Interference and Noise Ratio). The ordinate represents the bit error rate characteristic.

As indicated by a line 71 in FIG. 8, when the averaging time of the antenna weight calculation means 2 or 102 is sufficiently long, the bit error rate characteristic of the adaptive antenna receiving apparatus according to the first embodiment is the same as that of the conventional apparatus. This is because the phase difference between antennas is accurately estimated in both arrangements, as shown in FIG. 6. The averaging time of the antenna weight calculation means 2 or 102 is the total averaging time of the antenna signal in-phase averaging means 6 or 106 and time averaging means 9 or 108.

To the contrary, when the averaging time of the antenna weight calculation means 2 or 102 is short, the bit error rate characteristic of the above adaptive antenna receiving apparatus is indicated by a line 72, and that of the conventional apparatus is indicated by a line 73.

The first reason why the bit error rate characteristic of the first adaptive antenna receiving apparatus is better than that of the conventional apparatus is that the additional averaging effect is obtained by the antenna correlation averaging means 8. The second reason is that since the beam formed by the output from the fixed beam weight generation means 11 is a fixed beam, the gain outside the beam band can be suppressed.

Second Embodiment

Figure 3:
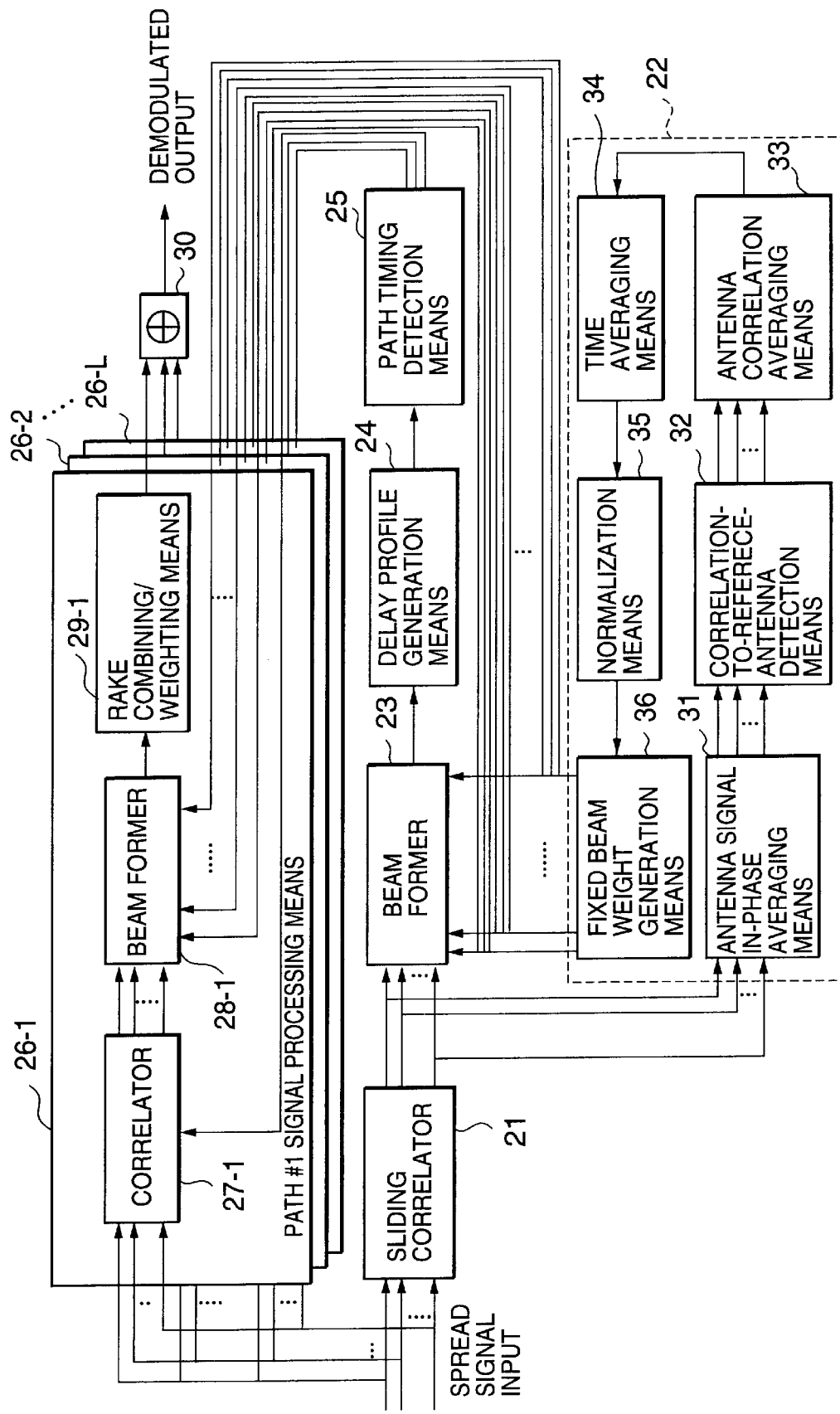
FIG. 3 is a block diagram showing the second embodiment of the present invention.

A second adaptive antenna receiving apparatus according to the second embodiment of the present invention will be described below with reference to FIG. 3.

As described above, in the first adaptive antenna receiving apparatus, in the demodulation/reception section, antenna weights are calculated by the antenna weight calculation means 2-1 to 2-L, and beam forming is executed for a demodulated signal. Despread signals are received at the respective path timings calculated independently on the input side of the demodulation/reception section (path signal processing means). In this case, an arbitrary method can be used to calculate each path timing.

To the contrary, in the second adaptive antenna receiving apparatus, antenna weights are calculated simultaneously with calculation of path timings, and the path timings are detected using a beam-formed signal. In the demodulation/reception section as well, beam forming is executed using the antenna weights at the detected path timings. This will be described below in detail.

This adaptive antenna receiving apparatus receives a CDMA spread signal that has passed through a multipath transmission path in a mobile communication environment is received to receive and demodulate a CDMA signal. As shown in FIG. 3, this apparatus has a sliding correlator 21, antenna weight calculation means 22, beam former 23, delay profile generation means 24, path timing detection means 25, L (L is a positive integer) path signal processing means 26-1 to 26-L corresponding to the number of paths, and combiner 30.

The sliding correlator 21 despreads signal with a plurality of chip timings at a resolving power of $1/N_R$ ($N_R$ is an integer; $1 \leq N_R$) of the chip period and outputs a despread signal sequence. Generally, $N_R$ is 4.

The antenna weight calculation means 22 has an antenna signal in-phase averaging means 31, adjacent antenna correlation detection means 32, antenna correlation averaging means 33, time averaging means 34, normalization means 35, and fixed beam weight generation means 36. The antenna weight calculation means 22 calculates an antenna weight for each output of the despread signal sequence from the sliding correlator 21. Processing of the antenna weight calculation means 22 for each output is executed as in the above first adaptive antenna receiving apparatus.

The beam former 23 forms a unique antenna directional beam to receive each despread signal sequence output from the sliding correlator 21.

The delay profile generation means 24 vector-averages the beam-formed signal sequence output in phase, calculates the power, and executes arbitrary time averaging, thereby generating a delay profile averaged at a predetermined period.

The in-phase averaging processing of the delay profile generation means 24 may be placed on the input side of the beam former 23 to reduce the arithmetic amount of the beam former 23. Alternatively, the delay profile generation means 24 may also be used as the antenna signal in-phase averaging means 31.

The path timing detection means 25 detects a plurality of path timings used by the reception/demodulation section on the basis of the delay profile. The path timing detection means 25 generally preferably uses a method of sequentially selecting the timing of a path of high level from the delay profile while setting a path selection interval of ¾ to 1 chip.

The path signal processing means 26-1 to 26-L have correlators 27-1 to 27-L, beam formers 28-1 to 28-L, and RAKE combining/weighting means 29-1 to 29-L, respectively. The path signal processing means 26-1 will be exemplified below.

The correlator 27-1 despreads a spread signal at the path timing detected by the path timing detection means 25.

The beam former 28-1 receives the output from the correlator 27-1 by the antenna directional beam, using the antenna weight of the corresponding path timing in the antenna weights calculated by the antenna weight calculation means 22.

The RAKE combining/weighting means 29-1 weights the beam output of each path and, more specifically, weights the beam outputs such that the SINR after combining is maximized.

The combiner 30 adds the outputs from the path signal processing means 26-1 to 26-L to obtain a high-quality demodulated output.

In the second embodiment, the beam formers 28-1 to 28-L of the demodulation/reception section use the antenna weights calculated by the path timing detection means 25. The demodulation/reception section may execute beam forming using antenna weights calculated by the antenna weight calculation means 22.

As described above, in the second adaptive antenna receiving apparatus, antenna weights are calculated in a short time by open loop control simultaneously with calculation of each path timing, and each path timing is detected using a beam-formed signal, thereby realizing an excellent path timing detection characteristic.

In addition, when the demodulation/reception section executes beam forming using the antenna weight of a corresponding path timing in antenna weights used by the path timing detection section, the demodulation/reception section need not newly calculate antenna weights.

What is claimed is:

1. An adaptive antenna receiving apparatus which receives a CDMA (Code Division Multiple Access) signal by an array antenna, adaptively forms a directional beam to receive a desired wave, and suppresses interference, wherein
a plurality of correlations between adjacent antennas are detected for each path, a fixed beam unique to each path arrival direction of the desired wave is formed on the basis of a vector generated by averaging the plurality of detected correlations, and each path is received and combined.

2. An apparatus according to claim 1, wherein an antenna weight of the fixed beam is generated to give 0 phase shift to a reception signal at a geometrical center of the array antenna.

3. An adaptive antenna receiving apparatus which receives a CDMA (Code Division Multiple Access) signal by an array antenna, adaptively forms a directional beam to receive a desired wave, and suppresses interference, wherein
a plurality of correlations between adjacent antennas are detected for each signal sequence despread with a plurality of chip timings, a fixed beam unique to an arrival direction of each signal sequence is formed on the basis of a vector generated by averaging the plurality of detected correlations, and a path timing is detected on the basis of a delay profile generated from an output of each signal sequence.

4. An apparatus according to claim 3, wherein an antenna weight of the fixed beam is generated to give 0 phase shift to a reception signal at a geometrical center of the array antenna.

5. An adaptive antenna receiving apparatus which receives a CDMA (Code Division Multiple Access) signal by an array antenna, adaptively forms a directional beam to receive a desired wave, and suppresses interference, wherein
a plurality of correlations between adjacent antennas are detected for each signal sequence despread with a plurality of chip timings, a fixed beam unique to an arrival direction of each signal sequence is formed on the basis of a vector generated by averaging the plurality of detected correlations, a path timing is detected on the basis of a delay profile generated from an output of each signal sequence, and each path is received and combined using the path timing and the fixed beam at the path timing.

6. An apparatus according to claim 5, wherein an antenna weight of the fixed beam is generated to give 0 phase shift to a reception signal at a geometrical center of the array antenna.

7. An adaptive antenna receiving apparatus which receives a CDMA (Code Division Multiple Access) signal by an array antenna, adaptively forms a directional beam to receive a desired wave, and suppresses interference, comprising:

antenna signal in-phase averaging means, arranged for each path, for in-phase-averaging a despread signal of each antenna;

adjacent antenna correlation detection means for detecting correlation between adjacent antennas for each output of said antenna signal in-phase averaging means;

antenna correlation averaging means for averaging outputs from said adjacent antenna correlation detection means;

time averaging means for time-averaging outputs from said antenna correlation averaging means;

normalization means for normalizing an output from said time averaging means;

fixed beam weight generation means for fixing an output from said normalization means;

a beam former for executing beam forming for the despread signal using an output from said fixed beam weight generation means;

RAKE combining/weighting means for weighting using an output from said beam former and the output from said fixed beam weight generation means; and a combiner for combining outputs from said RAKE combining/weighting means of respective paths and outputting a demodulated signal.

8. An apparatus according to claim 7, wherein said fixed beam weight generation means generates an antenna weight of a fixed beam to give 0 phase shift to a reception signal at a geometrical center of the array antenna.

9. An adaptive antenna receiving apparatus which receives a CDMA (Code Division Multiple Access) signal by an array antenna, adaptively forms a directional beam to receive a desired wave, and suppresses interference, comprising:

a sliding correlator for outputting a signal sequence obtained by dispreading a reception signal with a plurality of chip timings;

antenna signal in-phase averaging means, arranged for each signal sequence, for in-phase-averaging a signal of each antenna;

adjacent antenna correlation detection means for detecting correlation between adjacent antennas for each output of said antenna signal in-phase averaging means;

antenna correlation averaging means for averaging outputs from said adjacent antenna correlation detection means;

time averaging means for time-averaging outputs from said antenna correlation averaging means;

normalization means for normalizing an output from said time averaging means;

fixed beam weight generation means for fixing an output from said normalization means;

a beam former for executing beam forming for the despread signal sequence using an output from said fixed beam weight generation means;

delay profile generation means for generating a delay profile from an output from said beam former; and path timing detection means for detecting a path timing from the delay profile.

10. An apparatus according to claim 9, wherein said fixed beam weight generation means generates an antenna weight of a fixed beam to give 0 phase shift to a reception signal at a geometrical center of the array antenna.

11. An adaptive antenna receiving apparatus which receives a CDMA (Code Division Multiple Access) signal by an array antenna, adaptively forms a directional beam to receive a desired wave, and suppresses interference, comprising:

a sliding correlator for outputting a signal sequence obtained by dispreading a reception signal with a plurality of chip timings;

antenna signal in-phase averaging means, arranged for each signal sequence, for in-phase-averaging a signal of each antenna;

adjacent antenna correlation detection means for detecting correlation between adjacent antennas for each output of said antenna signal in-phase averaging means;

antenna correlation averaging means for averaging outputs from said adjacent antenna correlation detection means;

time averaging means for time-averaging outputs from said antenna correlation averaging means;

normalization means for normalizing an output from said time averaging means;

fixed beam weight generation means for fixing an output from said normalization means;

a first beam former for executing beam forming for the despread signal sequence using an output from said fixed beam weight generation means;

delay profile generation means for generating a delay profile from an output from said first beam former;

path timing detection means for detecting a path timing from the delay profile;

a second beam former arranged for each path to receive each path using the path timing and a fixed beam at the path timing;

RAKE combining/weighting means for weighting an output from said second beam former; and a combiner for combining outputs from said RAKE combining/weighting means of respective paths and outputting a demodulated signal.

12. An apparatus according to claim 11, wherein said fixed beam weight generation means generates an antenna weight of a fixed beam to give 0 phase shift to a reception signal at a geometrical center of the array antenna.

* * * * *